US009457996B2

(12) United States Patent
Winkler et al.

(10) Patent No.: US 9,457,996 B2
(45) Date of Patent: Oct. 4, 2016

(54) BALUSTRADE SUPPORT FOR AN ESCALATOR OR A MOVING WALKWAY

(71) Applicant: Inventio AG, Hergiswil (CH)

(72) Inventors: Gerald Winkler, Neusiedl am See (AT); Günther Horvath, Vienna (AT); Günther Niedermayer, Vienna (AT); Michael Matheisl, Vösendorf (AT)

(73) Assignee: INVENTIO AG, Hergiswil (CH)

(*) Notice: Subject to any disclaimer, the term of this patent is extended or adjusted under 35 U.S.C. 154(b) by 0 days.

(21) Appl. No.: 14/652,481

(22) PCT Filed: Dec. 6, 2013

(86) PCT No.: PCT/EP2013/075823
§ 371 (c)(1),
(2) Date: Jun. 16, 2015

(87) PCT Pub. No.: WO2014/095428
PCT Pub. Date: Jun. 26, 2014

(65) Prior Publication Data

US 2015/0329329 A1 Nov. 19, 2015

(30) Foreign Application Priority Data

Dec. 19, 2012 (EP) .................................... 12198104

(51) Int. Cl.
*B65G 23/22* (2006.01)
*B66B 23/22* (2006.01)
*B66B 21/02* (2006.01)
*B66B 21/10* (2006.01)
*B66B 19/00* (2006.01)

(52) U.S. Cl.
CPC ............... *B66B 23/22* (2013.01); *B66B 21/02* (2013.01); *B66B 21/10* (2013.01); *B66B 19/007* (2013.01); *Y10T 29/49828* (2015.01)

(58) Field of Classification Search
CPC ..... B66B 23/12; B66B 23/026; B66B 23/06; B66B 23/22; B66B 23/147
USPC .................................................. 198/330, 335
See application file for complete search history.

(56) References Cited

U.S. PATENT DOCUMENTS 5,992,606 A * 11/1999 Pallinger ................ B66B 23/22 198/335
6,102,186 A 8/2000 Pallinger
6,260,687 B1 * 7/2001 Ulrich .................. B66B 23/026 198/330
6,991,084 B2 * 1/2006 Lunardi ................. B66B 23/04 198/330
2006/0006046 A1 * 1/2006 Berger .................... B66B 21/00 198/326

FOREIGN PATENT DOCUMENTS

GB 678 454 A 9/1952
JP 2006 131376 A 5/2006

* cited by examiner

*Primary Examiner* — James R Bidwell
(74) *Attorney, Agent, or Firm* — Ladas & Parry LLP

(57) ABSTRACT

A balustrade support for an escalator or moving walk is located in a deflection area of the balustrade handrail. The support has a mounting region for mounting a handrail deflection wheel, a first fixing section for mounting the support to a framework of the escalator or moving walk, and a second fixing section for mounting the support to the balustrade. The rigidity of the support's mounting region for the deflection wheel is increased by the mounting of the support to the framework as well as to the balustrade.

13 Claims, 3 Drawing Sheets

B - B

A - A

BALUSTRADE SUPPORT FOR AN ESCALATOR OR A MOVING WALKWAY

The invention relates to a balustrade support, which is provided for the mounting of a deflection wheel, which is provided for deflecting a handrail, of an escalator or a moving walkway, and to an escalator or a moving walkway with such a balustrade support.

BACKGROUND OF THE INVENTION

Escalators or moving walkways comprise a circulating step belt for the transport of persons or objects and a framework. The step belt is bounded along its conveying length on each side by a respective balustrade, which is arranged on the framework. A circulating handrail is arranged at such a balustrade along its terminal.

U.S. Pat. No. 6,102,186 shows an escalator with a balustrade and a deflection wheel for deflecting a handrail. A wheel mounting for mounting the deflection wheel is fastened exclusively to the balustrade so that the balustrade itself has to be of sufficiently stable construction in order to able to accept the forces acting by the deflection wheel on the wheel bearing.

GB-A-678454 shows an escalator with a balustrade and a handrail. The handrail is guided or deflected in a deflecting region of the balustrade by means of a deflection wheel. The deflection wheel is mounted on a wheel mounting stay. The cladding of the balustrade is fixed to this wheel mounting stay and is carried by this wheel mounting stay.

The illustrated solution has the disadvantage that such a wheel mounting stay has to be of extremely solid construction so as to enable faultless operation of the escalator or the moving walkway. For this reason the balustrade has a relative high width in the conveying direction of the escalator, which also leads to an increased requirement of the escalator for space.

BRIEF SUMMARY OF THE INVENTION

It is therefore the object of the invention to create a balustrade support which has the consequence of a reduced requirement of the balustrade or the escalator for space.

The object is fulfilled by a balustrade support for an escalator or for a moving walkway, which balustrade support is fixable at least partly in a deflecting region, which belongs to a balustrade, of a handrail, wherein the balustrade support has a mounting region for the mounting of a deflection wheel, a first fastening section for the fastening of the balustrade support to a framework of the escalator or moving walkway and a second fastening section for the fastening of the balustrade support to the balustrade, wherein a stiffness of the mounting region is increased by the fastening of the balustrade support to the balustrade by means of the second fastening section. The object is equally fulfilled by an escalator or a moving walkway with such a balustrade support.

The object is also fulfilled by an escalator or a moving walkway with a balustrade and a balustrade support, which balustrade support is fixed at least partly in a deflecting region, which belongs to the balustrade, of a handrail and has a mounting region for mounting a deflection wheel, a first fastening section for fastening the balustrade support to a framework of the escalator or the moving walkway and a second fastening section for fastening the balustrade support to the balustrade, wherein a stiffness of the mounting region is increased by the fastening of the balustrade support to the balustrade by means of the second fastening section.

The object is equally fulfilled by modernisation of an escalator or a moving walkway by such a balustrade support.

It was recognised that a wheel support, which is fastened on the framework or a support structure, has to be of very solid construction, because this wheel support alone takes over the supporting function for the deflection wheel for deflecting the handrail. This is particularly so because the deflection wheel during operation of the escalator or the moving walkway, thus during movement of the handrail, is exposed to forces which should not lead to oscillations of the balustrade. This necessary solid construction of the wheel support has the consequence of an increased requirement for space and material.

In order to minimise this increased requirement for space or material it was sought to reduce the forces acting on the wheel support. This is achieved by means of the balustrade support, which on the one hand is fastened or fixed to the framework or support structure and on the other hand to a balustrade, wherein the balustrade has an inherent load-bearing capability. The stability or stiffness of the balustrade is utilised in that way in order to reduce the loads acting on the balustrade support. It is advantageous that the balustrade of the escalator or moving walkway can be of very slender construction along its length for unchanged balustrade thickness. Accordingly, the balustrade support is preferably made of steel.

A development of the balustrade support comprises a balustrade stay, which balustrade stay is provided for stabilisation of the balustrade. It is possible by means of the balustrade stay to additionally support or stabilise the balustrade in the immediate vicinity of its deflecting region, thus the transport region of the balustrade, which has the consequence of increased stability of the deflecting region of the balustrade. The mounting region of the balustrade support can thus be additionally stabilised with the help of the intrinsic stiffness of the balustrade in its deflecting region. A development of the balustrade stay is provided for the support of a balustrade profile member. A stabilisation of the balustrade profile member produces an additional stabilisation of the balustrade and thus of the mounting region of the balustrade support.

In a development of the balustrade support the first fastening section, the mounting region and the second fastening section are arranged along a substantially straight line, wherein the mounting region can be arranged between the first and second fastening sections. A support limb can be constructed, preferably continuously, along this substantially straight line between the first fastening section and the mounting region or the second fastening section. An increase in the stability and load-bearing capability of the mounting of the deflection wheel in the mounting region is achievable by means of such an arrangement.

A development of the balustrade support is fastenable by means of the second fastening section to the balustrade wall. Alternatively thereto the balustrade support is fastenable by means of the second fastening section to a or the balustrade profile member of the balustrade. In a development of the balustrade support the second fastening section of the balustrade support is fastenable to a deflection curve of the balustrade. By means of the said arrangements of the second fastening section of the balustrade support increased stiffness of the mounting region can be achieved by the co-operation of the different interconnected balustrade components. For example, the deflection curve of the balustrade has in the immediate vicinity of the deflected handrail and the balustrade profile member an increased stability by virtue of the arrangement thereof at the balustrade.

A development of the balustrade support comprises a curve section, which can be arranged along the deflection curve of the balustrade, wherein the second fastening section is arranged along the curve section of the balustrade support such that the balustrade support is fastenable by means of the second fastening section along the deflection curve of the balustrade.

A development of the escalator or the moving walkway comprises such an afore-described balustrade support. By means of the fastening of the balustrade support to the balustrade wall or to the balustrade profile member fastened to the balustrade wall is possible to use the intrinsic stiffness or intrinsic load-bearing capability of the balustrade wall in order to increase the stiffness of the balustrade support and to be able to arrange the mounting region of the balustrade support in a more stable manner in the escalator or the moving walkway. The balustrade wall of the escalator or the moving walkway can have a wall thickness of 3 to 20 millimeters, preferably 10 to 12 millimeters. A correspondingly high wall thickness, thus also a high level of stiffness, of the balustrade wall equally makes possible a high level of stiffness of the balustrade support or of the mounting region.

BRIEF DESCRIPTION OF THE FIGURES

The invention is explained in more detail in the following by way of figures, in which.

DETAILED DESCRIPTION OF THE INVENTION

Figure 1:
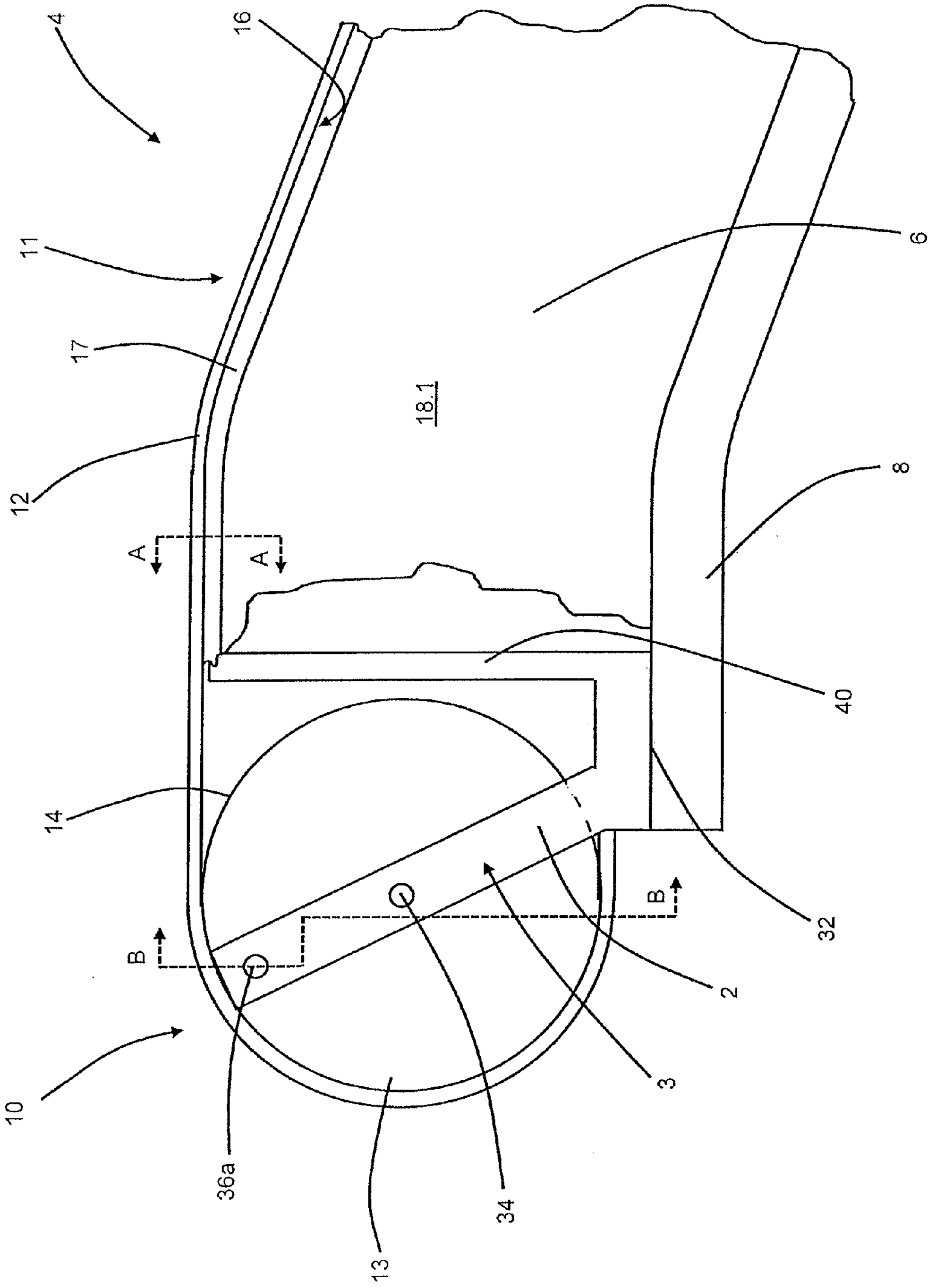
FIG. 1 shows a side view of an escalator with a balustrade support in the installed state.

FIG. 1 shows a side view of an escalator 4 with a balustrade support 2 in the installed state. The escalator 4 comprises a framework 8, a balustrade 6, a handrail 12 and the balustrade support 2. The balustrade 6 has a balustrade wall 18.1. The balustrade 6 forms a transport region 11 and a deflecting region 10. The deflecting region 10 of the balustrade 6 is provided for the deflection of the handrail 12. The balustrade 6 has a deflection curve 13 in the deflecting region 10. The balustrade 6 can have a balustrade profile member 17 along its outer edge, which balustrade profile member 17 represents, for example, a suitable constructional boundary of the balustrade 6. The balustrade profile member 17 is arranged in the deflecting region 10 along a deflection curve 13. In the transport region 11 the balustrade 6 can have a handrail profile member 16 along its outer edge, on which handrail profile member 16 the handrail 12 is guided. The handrail 12 is deflected or guided in the deflecting region 10 along the deflection curve 13 by means of a deflection wheel 14. In the further course—which is usually not visible to a passenger on the escalator 4—of the handrail 12, this handrail 12 can be guided within a balustrade base of the balustrade 6 or within the framework 8 of the escalator 4.

The balustrade support 2 comprises a first fastening section 32, a secondary, second fastening section 36*a* and a mounting region 34. The balustrade support 2 can comprise a balustrade stay 40. The deflection wheel 14 can be or is rotatably mounted at the mounting region 34 of the balustrade support 2. The balustrade support 2 is fastenable or fastened to the framework 8 by means of the first fastening section 32. The balustrade support 2 is fastenable or fastened to the balustrade 6 by means of the secondary fastening section 36*a*. The secondary fastening section 36*a* can be equally used to fix the balustrade support 2 to the balustrade 6, for example glue and/or clamp. By means of this fastening of the balustrade support 2 to the balustrade 6 the inherent stiffness or the stability of the balustrade 6 can be utilised in order to increase the stiffness of the balustrade support 2 so that the mounting region 34 of the balustrade support 2 or the defection wheel 14 is arranged more stably in or at the balustrade 6. This means that the part of the support limb 3 arranged between the first fastening section 32 and the mounting region 34 can be constructed to be less stable or can be constructed to be more slender than would be the case with a balustrade support without such a secondary fastening section 36*a*.

The secondary fastening section 36*a* can, as an alternative to the illustrated construction, be arranged, for example, in the immediate vicinity of the mounting region 34 in order to increase the stiffness of the mounting region 34 by an additional fastening by means of the second fastening section 36*a* to a balustrade wall of the balustrade 6. The stability of the balustrade 6 in the deflecting region 10 or in the immediate vicinity of the deflecting region 10 can additionally be increased by means of the balustrade stay 40.

The characteristics or components, which are mentioned within this description, of the illustrated escalator can equally be understood as characteristics or components of moving walkways.

Figure 2:
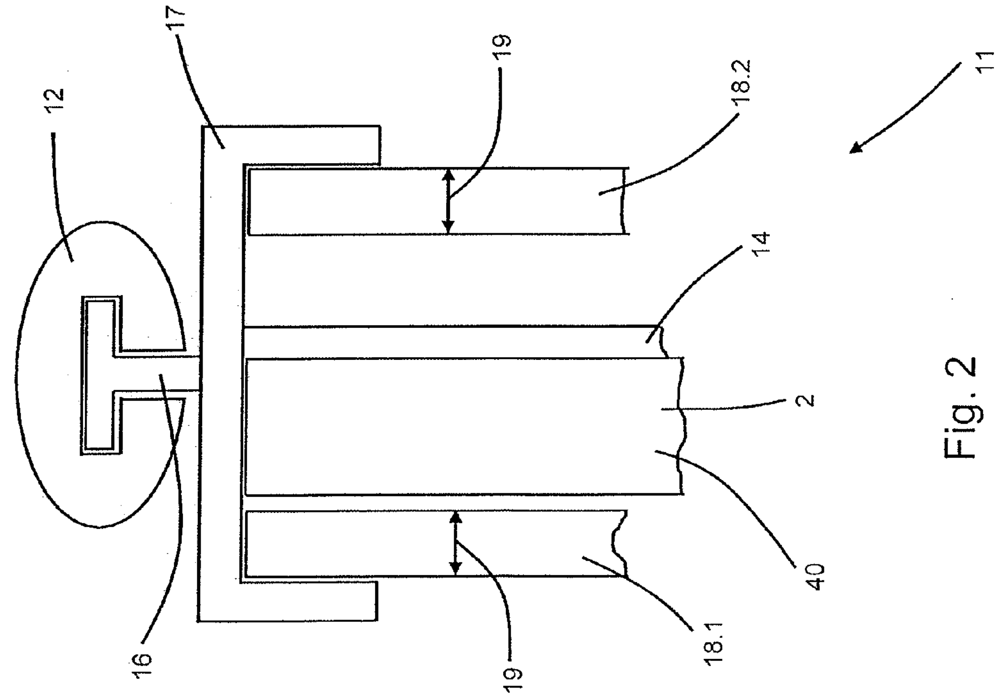
FIG. 2 shows a sectional illustration of the balustrade shown in FIG. 1.

FIG. 2 shows a sectional illustration through an upper part of the balustrade 6 shown in FIG. 1, wherein the section is executed for illustration in the transport region 11 of the balustrade 6. In addition, the balustrade 6 can have a second balustrade wall 18.2. The balustrade stay 40 of the balustrade support 2 can be additionally reinforced in such a manner that the deflection wheel 14 according to the depicted sectional illustration is arranged partly behind the balustrade stay 40. For stabilisation of the balustrade 6 a component of the balustrade 6 can be connected, preferably fixedly connected, with the balustrade stay 40 of the balustrade support 2. For this purpose the handrail profile member 16 and/or the balustrade profile member 17 and/or the balustrade wall or one of the balustrade walls 18.1, 18.2 can be fixed to the balustrade stay 40. The balustrade 6 can have a high level of intrinsic stiffness, because the at least one balustrade wall 18.1, 18.2 has, for example, a wall thickness 19 of 3 to 20 millimeters, preferably 10 to 12 millimeters. Such a balustrade wall 18.1, 18.2 can be transparent. This balustrade wall 18.1, 18.2 can be made of composite-pane safety glass and/or double-pane safety glass or single-pane safety glass or of stone.

Figure 3:
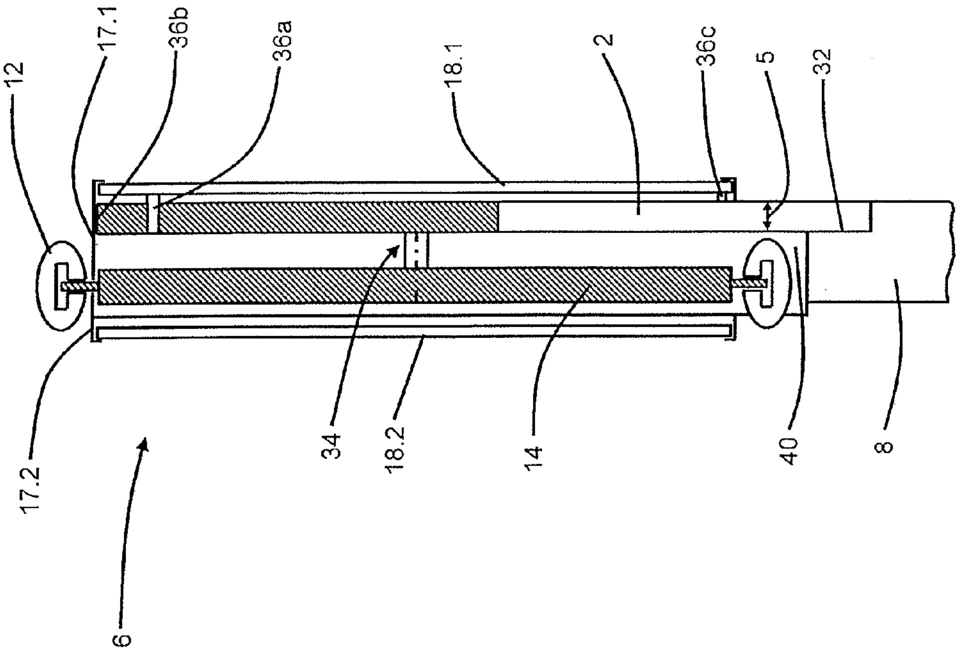
FIG. 3 shows a further sectional illustration of the balustrade shown in FIG. 1.

FIG. 3 shows a further sectional illustration of the balustrade 6 depicted in FIG. 1, wherein the section is taken for illustration through the deflecting region 10, which is shown in FIG. 1, of the balustrade 6. The course of the section is characterised by the section line B-B in FIG. 1. In the deflecting region 10 the balustrade 6 can have at least one balustrade profile member section 17.1, 17.2, wherein the balustrade profile member section 17.1, 17.2 is arranged along the deflection curve of the balustrade 6. The deflection wheel 14 for transport or guidance or support of the handrail 12 can be mounted at the mounting region 34 of the balustrade support 2 and, for example, arranged between the two balustrade walls 18.1, 18.2. The balustrade wall 18.1 can, by way of example, be fixed to a balustrade base (not illustrated) of the balustrade 6. The fastening of the balustrade support 2 by means of the first fastening section 32 thereof to the framework 8 of the escalator can be realised, for example, by means of a screw connection and/or welded connection.

In addition to the secondary fastening section 36*a* already shown in FIG. 1 the balustrade support 2 can comprise further secondary fastening sections 36*b*, 36*c* in order to be able to fasten or fix the balustrade support 2 to the balustrade 6. For preference, the secondary fastening section 36*a*, 36*c* can accordingly be so positioned at the balustrade support 2 that the balustrade support 2 can be fastened by means of these secondary fastening sections 36*a*, 36*c* to a first one of the balustrade walls 18.1 of the balustrade 6. The secondary fastening section 36*b* can in addition or alternatively thereto be arranged in such a manner that the balustrade support 2 can be fastened to a first one 17.1 of the balustrade profile member sections.

In such a fastening by means of the at least one secondary fastening section 36*a*, 36*b*, 36*c* the balustrade support 2 can be fastened merely to each balustrade wall 18.1 or to each balustrade profile member section 17.1, which balustrade wall 18.1 or which balustrade profile member section 17.1 is disposed in accordance with the cross-section shown in FIG. 3 on the same side of the deflection wheel 14 as this at least one secondary fastening section 36*a*, 36*b*, 36*c* of the balustrade support 2 itself.

The reason for that is that the at least one secondary fastening section 36*a*, 36*b*, 36*c* in the case of a side view of the balustrade 6 can be projected onto the projection surface of the deflection wheel 14. This means that a fastening of that kind of the balustrade support 2 to a second one of the balustrade walls 18.2 or to a second one of the balustrade profile member sections 17.2 is prevented by the positioning of the deflection wheel 14 between the at least one secondary fastening section 36*a*, 36*b*, 36*c* and the respective component 17.2, 18.2 of the balustrade 6. A connection in the region of this projection surface between the first balustrade wall 18.1 and the second balustrade wall 18.2 and also between the first balustrade profile member section 17.1 and the second profile member section 17.2 is thereby made impossible.

The balustrade support 2 can have, by way of example, a material thickness of 10 to 50 millimeters, particularly 15 to 25 millimeters. The balustrade stay 40 can, independently thereof, be reinforced in such a manner that it is arranged in the transport region of the balustrade 6 to be partly below the handrail 12. A reinforcement of that kind of the balustrade stay 40 increases the stability of the balustrade 6 surrounding the balustrade stay 40.

Figure 4:
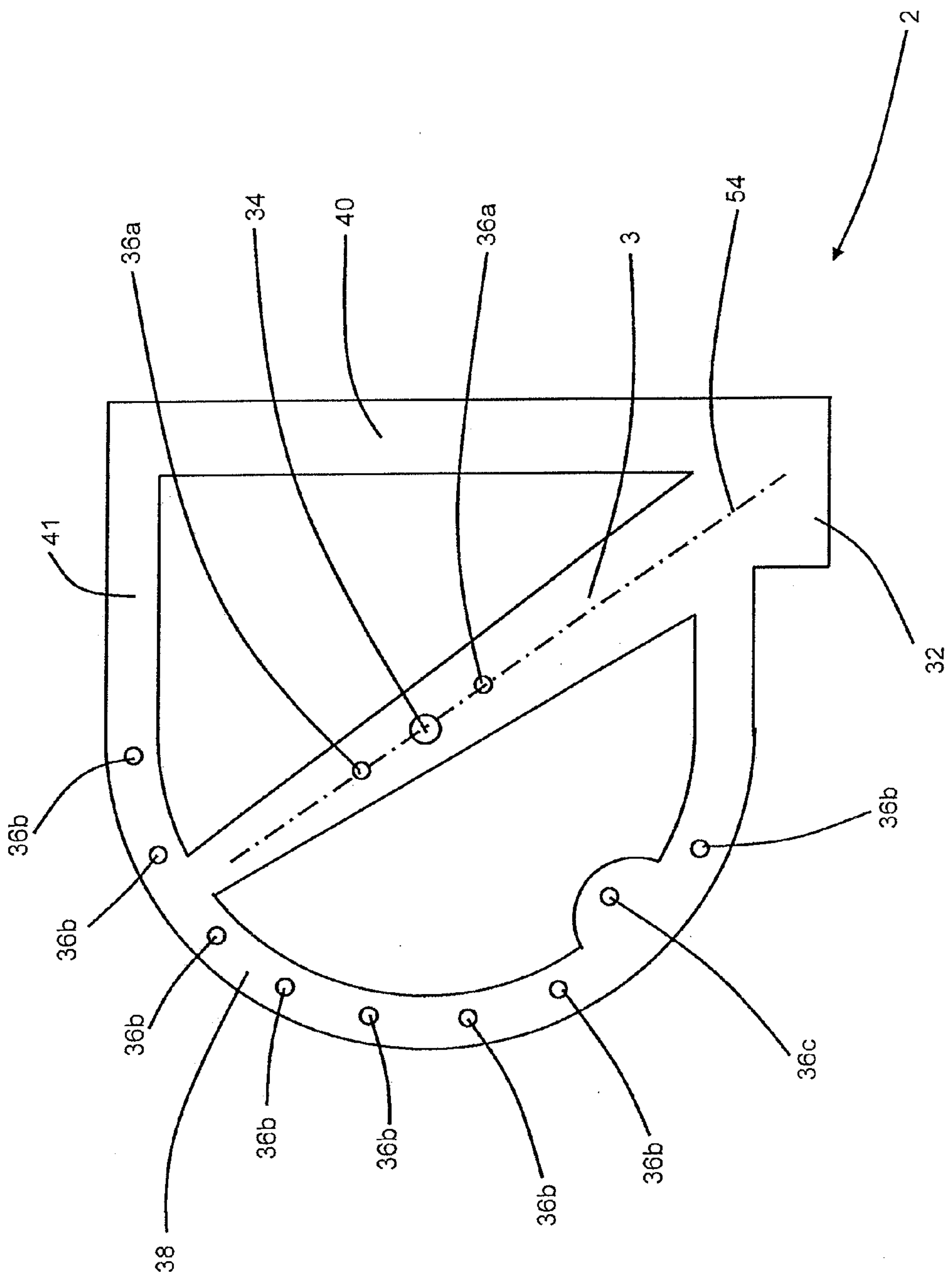
FIG. 4 shows a balustrade support arranged in a balustrade of an escalator or a moving walkway.

FIG. 4 shows a balustrade support 2 which can be arranged in the deflecting region of a balustrade. The balustrade support 2 comprises a first fastening section 32 for fastening the balustrade support 2 to the framework of the moving walkway or the escalator and at least one secondary fastening section 36*a*, 36*b*, 36*c* for fastening the balustrade support 2 to the balustrade 6. The balustrade support 2 comprises a mounting region 34, at which mounting region 34 a deflection wheel can be mounted to be rotatable. The balustrade support 2 can comprise a curve section 38, which curve section 38 can be arranged along the deflection curve of the balustrade.

The first fastening section 32, the mounting region 34 and a first one of the secondary fastening sections 36*a* can in that case be arranged along a substantially straight line 54, wherein the mounting region 34 can be arranged between the first fastening section 32 and the second fastening section 36*a*. A support limb 3 is preferably constructed to be continuous along this line 54 between the first fastening section 32 and the mounting region 34 or the fastening section 36*a* so as to increase to the stiffness of the mounting region 34. A second secondary fastening section 36*c* for fastening of the balustrade support 2 to the balustrade wall can, for example, be arranged at the curve section 38. A third secondary fastening section 36*b* can be arranged at the curve section 38 in order to be able to fasten the balustrade support 2 to the balustrade profile member of the balustrade. In order to increase the stiffness of the balustrade support 2 an optional balustrade stay 40 can be connected with the curve section 38 by means of a connecting web 41, which connecting web 41 is, for example, provided for arrangement in the immediate vicinity of the balustrade profile member of the balustrade.

The invention claimed is:

1. Balustrade support (2) for an escalator (4) or for a moving walkway, which balustrade support (2) is fixable in a handrail deflecting region (10), of a balustrade (6), wherein the balustrade support (2) comprises a mounting region (34) for mounting a deflection wheel (14), a first fastening section (32) for fastening the balustrade support (2) to a framework (8) of the escalator (4) or moving walkway and a second fastening section (36*a*, 36*b*, 36*c*) for fastening the balustrade support (2) to the balustrade (6), the first fastening section, the mounting region, and the second fastening section being arranged along a straight line, wherein the stiffness of the mounting region (34) is increased by the fastening of the balustrade support (2) to the balustrade (6) by means of the second fastening section (36*a*, 36*b*, 36*c*).

2. Balustrade support (2) according to claim 1, further comprising a balustrade stay (40), which balustrade stay (40) is provided for stabilising the balustrade (6).

3. Balustrade support (2) according to claim 2, wherein the balustrade stay (40) is provided and adapted for supporting a balustrade profile member (17).

4. A method for modernisation of an escalator (4) or a moving walkway comprising the step of retrofitting the escalator or moving walkway with a balustrade support (2) according to claim 1.

5. Balustrade support (2) according to claim 1, wherein the balustrade support (2) is fastenable by means of the second fastening section (36*a*, 36*c*) to a balustrade wall (18.1) of the balustrade (6).

6. Balustrade support (2) according to claim 1, wherein the balustrade support (2) is fastenable by means of the second fastening section (36*b*) to a balustrade profile member (17, 17.1) of the balustrade (6).

7. Balustrade support (2) according to claim 1, wherein the second fastening section has a curve section for fastening the balustrade support (2) to a deflection curve (13) of the balustrade (6).

8. Balustrade support (2) according to claim 1 wherein the mounting region (34) is arranged between the first and second fastening sections (32, 36*a*, 36*b*, 36*c*).

9. Escalator (4) or moving walkway, comprising a balustrade (6) and a balustrade support (2) fixed in a handrail deflecting region (10) of the balustrade, the balustrade support having a mounting region (34) for mounting a deflection wheel (14), a first fastening section (32) for fastening the balustrade support (2) to a framework (8) of the escalator (4) or moving walkway and a second fastening section (36*a*, 36*b*, 36*c*) for fastening the balustrade support (2) to the balustrade (6), the first fastening section, the mounting region, and the second fastening section being arranged along a straight line, wherein the stiffness of the mounting region (34) is increased by the fastening of the balustrade support (2) to the balustrade (6) by means of the second fastening section (36*a*, 36*b*, 36*c*).

10. Escalator (4) or moving walkway according to claim 9, wherein the balustrade (6) comprises a balustrade wall (18.1), which balustrade wall (18.1) is fastened to the second fastening section (36*a*, 36*c*).

11. Escalator (4) or moving walkway according to claim 10, wherein the balustrade wall (18.1) has a wall thickness (19) of 3 to 20 millimeters.

12. Escalator (4) or moving walkway according to claim 9, wherein the balustrade (6) comprises a balustrade profile member section (17.1), which balustrade profile member section (17.1) is fastened to the second fastening section (36*b*).

13. Escalator (4) or moving walkway according to claim 11, wherein the balustrade wall (18.1) has a wall thickness (19) of 10 to 12 millimeters.

* * * * *